(12) United States Patent
Ras et al.

(10) Patent No.: US 11,879,566 B1
(45) Date of Patent: Jan. 23, 2024

(54) PINCH VALVE ASSEMBLY AND METHOD FOR USING SAME

(71) Applicant: Moray Group, LLC, Elk Grove Village, IL (US)

(72) Inventors: Chris Ras, Elk Grove Village, IL (US); Saran Kumar Boyilla, Ottawa, IL (US); David Ridge, Ottawa, IL (US)

(73) Assignee: Moray Group, LLC, Elk Grove Village, IL (US)

( * ) Notice: Subject to any disclaimer, the term of this patent is extended or adjusted under 35 U.S.C. 154(b) by 0 days.

(21) Appl. No.: 17/813,084

(22) Filed: Jul. 18, 2022

(51) Int. Cl.
| F16L 55/165 | (2006.01) |
| F16K 7/07 | (2006.01) |
| F16L 55/179 | (2006.01) |

(52) U.S. Cl.
CPC .......... *F16K 7/075* (2013.01); *F16L 55/1651* (2013.01); *F16L 55/179* (2013.01)

(58) Field of Classification Search
CPC ...... F16L 55/18; F16L 55/1651; B29C 63/36; B29C 67/0018; Y10S 118/10
USPC ............... 138/97, 98; 405/184.2; 156/294; 264/516
See application file for complete search history.

(56) References Cited

U.S. PATENT DOCUMENTS

| 4,581,247 A | 4/1986 | Wood |
| 4,680,066 A | 7/1987 | Wood |
| 5,154,936 A * | 10/1992 | Driver ............... F16L 55/18 |
| | | 118/DIG. 10 |
| 6,539,979 B1 * | 4/2003 | Driver ............... B29C 63/34 |
| | | 156/287 |
| 7,845,372 B2 | 12/2010 | Kiest, Jr. |
| 9,074,720 B2 | 7/2015 | D'Hulster |
| 10,247,348 B2 | 4/2019 | Meier |
| 10,458,591 B2 | 10/2019 | Kiest, Jr. |
| 2004/0149341 A1 * | 8/2004 | Driver ............... B29C 63/34 |
| | | 264/516 |

(Continued)

FOREIGN PATENT DOCUMENTS

DE 102015200149 A1 7/2016

OTHER PUBLICATIONS

International Search Report and Written Opinion for PCT/US2023/070194 dated Aug. 25, 2023.

*Primary Examiner* — Patrick F Brinson
(74) *Attorney, Agent, or Firm* — Nyemaster Goode, P.C.

(57) ABSTRACT

A pinch valve configured to be combined with an inversion apparatus. An elongated component, such as a rope, cable, or light train, is able to pass through the lumen of the pinch valve during the positioning and curing of a repair assembly into an underground pipe system. A deformable member positioned within the housing is movable between a first position having a first internal diameter and a second position having a second internal diameter that is smaller than the first internal diameter. In the second position the deformable member is moved to constrict around the elongated component as the component passes through the valve. This helps prevent pressure from escaping through the pinch valve by decreasing the space between the deformable member and the elongated component. In this manner, the internal diameter of the pinch valve is able to conform to various diameters of elongated components passing through the valve in real time by moving the deformable member to create the desired internal diameter.

32 Claims, 10 Drawing Sheets

(56) References Cited

U.S. PATENT DOCUMENTS

| | | | |
|---|---|---|---|
| 2006/0060255 A1* | 3/2006 | Driver ................ | F16L 55/1651 405/184.2 |
| 2007/0031194 A1* | 2/2007 | Driver ................ | F16L 55/1651 405/184.2 |
| 2018/0229404 A1 | 8/2018 | Starr et al. | |
| 2020/0182391 A1 | 6/2020 | Kennard et al. | |
| 2020/0300403 A1 | 9/2020 | Taylor | |

* cited by examiner

PINCH VALVE ASSEMBLY AND METHOD FOR USING SAME

BACKGROUND

The present invention relates to a device and method for repairing pipe, such as underground sewer pipe and the like.

Some methods for repairing damaged pipe lines include moving a liner tube impregnated with a liquid material capable of curing and hardening to the position within the pipe where the damaged portion is located. The liner tube is either pulled in place or inflated and inverted into the pipe to the damaged area in need of repair. The liner tube is urged in an outward radial direction into contact with the pipe line being repaired and the liquid material impregnating the liner tube is permitted to cure and harden. The liner tube forms an interior liner in the pipe for the pipe line being repaired.

On some occasions lateral pipe lines are connected to main pipe lines. Often damage occurs at the junction between the lateral pipe line and the main pipe line. T-shaped or Y-shaped liner tubes have been utilized to fit within the junction between the lateral pipe line and the main pipe line. Liner tubes form a T-shaped or Y-shaped liner after hardening to the interior of the junction between the lateral pipe line and the main pipe line.

A method used for repairing pipelines and other structures includes the use of a liner tube having a felt layer on its inside and having a protective layer made of polymer or other plastic material on its outside. The liner tube is vacuum-impregnated with a resin mix in what is commonly referred to as a "wet-out" process. A catalyst is mixed with the resin so as to activate the resin and cause it to begin curing and hardening. The resin impregnated liner tube is then inverted into the pipeline so that the felt layer is inverted from the inside of the tube to the outside. Once the resin cures and hardens, the liner provides a new lining for the pipeline. Some resins are set to cure at ambient temperatures. Other resins have a light-activated initiator embodied therein so that curing is initiated by exposure to a predetermined wavelength of light, such as ultra-violet light.

Many inversion processes include attaching an elongated member such as a rope, cable, or light train to the inverting repair assembly so that the inverting liner or bladder pulls the elongated member through the pipe to the distal end of the inverted member. The repair assembly may include a liner assembly, bladder assembly, positioning tube, parachute bladder, or other components. For example, U.S. patent application Ser. No. 17/571,912 (Ras) discloses attaching a light train to a liner or bladder and U.S. Pat. No. 9,074,718 (Kiest) and 10,458,591 (Kiest) disclose attaching a rope or line to a bladder, the complete disclosures of these references are hereby incorporated by this reference. During inversion and curing it is desirable to maintain pressure to the repair assembly to invert or inflate the repair assembly as the elongated member moves from the ambient (non-pressurized) side through the inversion assembly and into the pressurized liner or pipe. The elongated member is often fed into the inverting repair assembly through an opening that is not pressurized. Thus, pressure introduced into the system to help invert the repair assembly into the pipe can escape through the opening causing reduced efficiency. The loss of inversion pressure may negatively affect the distance the inversion apparatus can shoot the liner into the pipe. It may also prevent the liner from fully inflating against the interior walls of the host pipe.

Therefore, there is a need for an improved method and apparatus for repairing pipes which overcomes these and other problems in the art.

SUMMARY

According to one aspect of the present invention, a pinch valve apparatus is provided. The pinch valve includes a housing having a lumen therein between a first opening and a second opening, the lumen is configured to receive an elongated component such as a rope, cable, or light train. A deformable member is positioned within the housing along the lumen, wherein the deformable member is movable between a first position having a first internal diameter and a second position having a second internal diameter that is smaller than the first internal diameter. Some embodiments further include a containment sleeve positioned radially outward from the deformable member, the containment sleeve is movable between a first containment sleeve position having a first containment sleeve internal diameter and a second containment sleeve position having a second containment sleeve internal diameter that is smaller than the first containment sleeve internal diameter. An assembly is configured to selectively move the containment sleeve and/or deformable member from the first position to the second position. In some embodiments the assembly is one of a pressure assembly, a vacuum assembly, a mechanical assembly, and an electromechanically assembly. In one embodiment the assembly is a pressure assembly comprising a fluid channel configured to selectively introduce fluid pressure from a fluid pressure source into a cavity formed between the housing and the containment sleeve and/or deformable member.

According to another aspect of the present invention, a pinch valve apparatus is provided. The pinch valve generally includes a housing having a lumen therein between a first opening and a second opening. The pinch valve is configured to be combined with an inversion apparatus or curing cap such that an elongated component, such as a rope, cable, or light train, is able to pass through the lumen of the pinch valve during the positioning and curing of a repair assembly into an underground pipe system. The repair assembly may include a liner assembly, bladder assembly, positioning tube, parachute bladder, or other components. A deformable member, which may be a sleeve, is positioned within the housing along the lumen between the first opening and the second opening. The deformable member is movable between a first position having a first internal diameter and a second position having a second internal diameter that is smaller than the first internal diameter. Any suitable means may be used to move the deformable member between the first position and the second position, including pressure, vacuum, mechanical, and electromechanically assemblies. In the second position the deformable member is moved to constrict around the elongated component as the component passes through the valve. This helps prevent pressure from escaping through the pinch valve by decreasing the space between the deformable member and the elongated component. In this manner, the internal diameter of the pinch valve is able to conform to various diameters of elongated components passing through the valve in real time by moving the deformable member to create the desired internal diameter.

According to another aspect of the present invention, a pinch valve apparatus is provided. The pinch valve generally includes a housing having a lumen therein between a first opening and a second opening. The pinch valve is configured to be combined with an inversion apparatus or curing cap such that an elongated component, such as a rope, cable, or light train, is able to pass through the lumen of the pinch valve during the positioning of a repair assembly into an underground pipe system. The repair assembly may include a liner assembly, bladder assembly, positioning tube, parachute bladder, or other components. A deformable member, which may be a sleeve, is positioned within the housing along the lumen between the first opening and the second opening. The deformable member is movable between a first position having a first internal diameter and a second position having a second internal diameter that is smaller than the first internal diameter. The deformable member is made from a first material configured to engaged the elongated member. A second layer, sometimes referred to herein as a containment sleeve, is made from a second material and configured to be positioned radially outward from the first layer. The deformable member is made from a material configured to seal against the elongated member and the containment sleeve is made from a material that is more robust and less stretchable than the first layer (less compressible and less likely to overstretch). One or both of the deformable member and containment sleeve create a sealed volume between the outer diameter of the member/sleeve and the inner diameter of the housing wall. Any suitable means may be used to move the deformable member and/or containment sleeve between the first position and the second position, including pressure, vacuum, mechanical, and electromechanically assemblies. In one embodiment a fluid port is combined with the housing to selectively provide fluid pressure into the sealed volume between the housing and the member to cause the member to move between the first and second position. In the second position the deformable member and containment sleeve are inflated to constrict around the elongated component as the component passes through the valve. This helps prevent inversion and inflation pressure (used to position the repair assembly in the pipe) from escaping through the pinch valve by decreasing the space between the deformable member and the elongated component. The pinch valve is able to conform to various diameters of elongated components passing through the valve in real time by inflating and deflating the member to create the desired internal diameter.

In some embodiments the apparatus further includes a lubricator for dispensing lubricant onto the elongated component before it passes through the pinch valve. The lubricator generally includes a housing having a cavity therein with a first opening and a second opening. A reservoir is positioned within the cavity, the reservoir is configured to receive a lubricating solution. A fluid coupling is configured to receive a flow of a gaseous fluid, such as air, which is expelled through one or more nozzles in the reservoir. The gaseous fluid flowing out of the nozzles causes the lubricating solution to bubble, spray, or splatter toward and onto the elongated component moving through the lubricator to help lubricate the exterior surface of the elongated component. This provides lubrication to the elongated component without having to pump/spray lubricating solution through a nozzle. A brush or seal may be positioned between the reservoir and the first opening to help prevent lubricating solution from splattering out of the cavity.

In some embodiments the apparatus further includes a distance counter. The counter may include one or more rollers which are configured to engage the elongated component as it moves through the apparatus causing the rollers to rotate. The rollers are attached to a counting mechanism that tracks and displays the rotational distance traveled by the outer diameter of the rollers, which is the same as the length of elongated member which passes over the rollers.

Another aspect of the invention includes a method of using the apparatus described above. The method includes operatively connecting a pinch valve to an inversion apparatus then taking a repair assembly and an elongated component and passing the elongated component through the pinch valve. The elongated component may be attached to a trailing portion of the repair assembly so the inverting repair assembly pulls the elongated component through the pinch valve or the elongated component may be fed into the pipe system manually by pushing or pulling. The deformable member is moved from a first position to a second position, wherein the opening or internal diameter of the deformable member is smaller in the second position. In some embodiments the opening or internal diameter of the deformable member approximates the size or diameter of the elongated component. If the diameter of the elongated component changes as it is passing through the pinch valve, the deformable member is moved to a third position which may have a larger or smaller opening or internal diameter and may approximate the size or diameter of the elongated component along that portion. Fluid pressure (such as air pressure) is used to inflate and/or invert the repair assembly into the pipe and urge the liner member into contact with the interior walls of the pipe line as the elongated component is fed through the pinch valve. The positive pressure, however, is restricted from escaping through the pinch valve because the deformable member closes around the elongated component.

DETAILED DESCRIPTION

Figure 1:
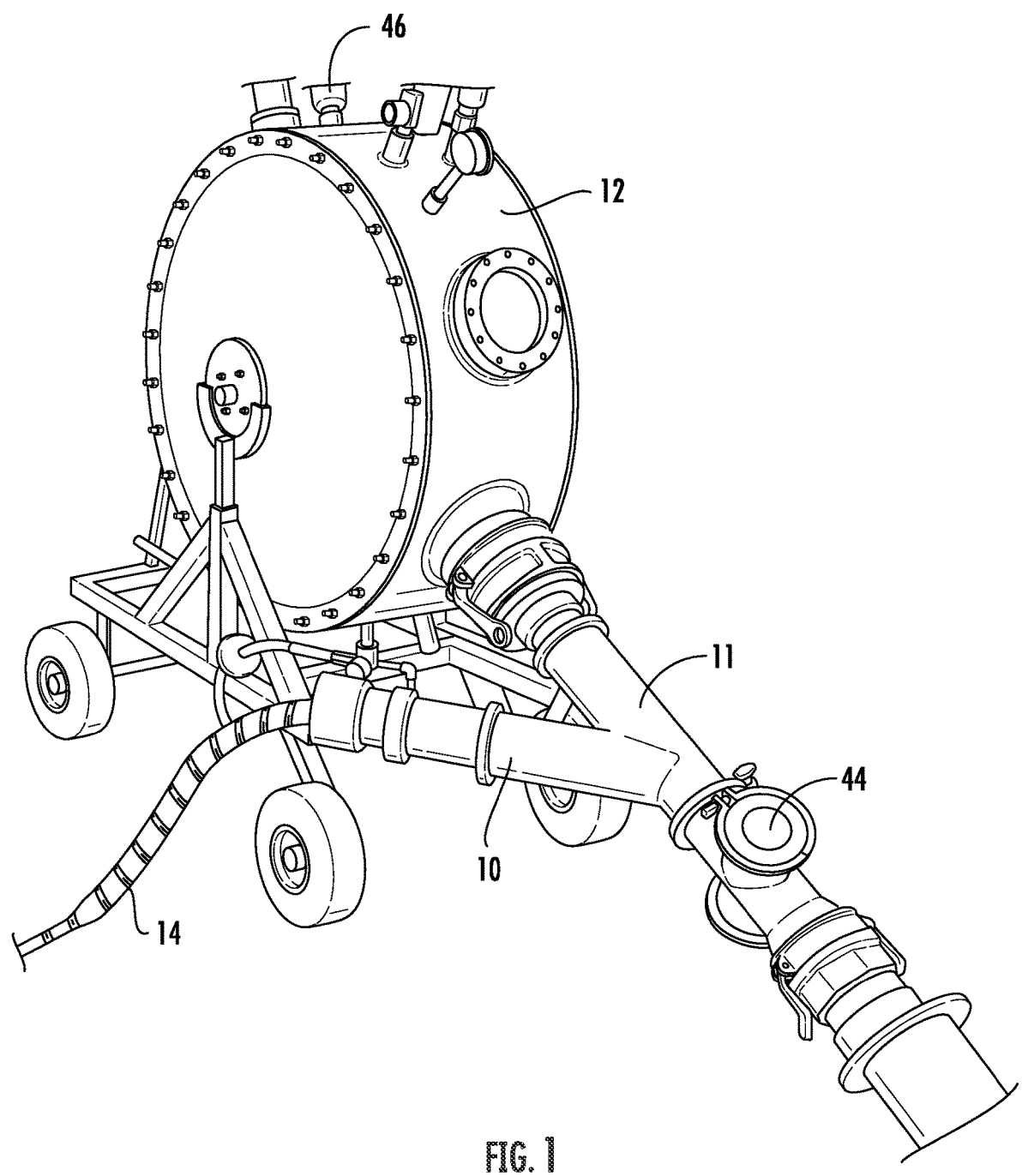
FIG. 1 is a perspective view showing a pinch valve combined with an inversion machine.

The invention generally relates to a pinch valve 10 which may be combined with a lubricator 30 and a counter 24 in some embodiments. As shown in FIG. 1, the pinch valve 10 is configured to be combined with an inversion apparatus 12 such as an inversion drum or curing cap. The inversion apparatus 12 typically includes a system configured to provide positive pressure to inflate and/or invert a repair apparatus 15, which may include a liner assembly 15A and/or a bladder assembly 15B, inside a pipe 42. As shown in FIG. 1, the inversion apparatus 12 includes a pressure fitting 46 configured to introduce pressure into the apparatus 12 from an outside source and a primary fitting 11 through which the repair assembly 15 is inverted. In some embodiments the repair assembly 15 is wound on a reel inside the inversion apparatus 12. The repair assembly 15 has a first end combined with the primary fitting 11 (or a component extending from the inversion apparatus 12) and a trailing portion which is the last portion of the repair assembly 15 to leave the inversion apparatus 12 and the portion of the repair assembly 15 which travels farthest through the pipe 42. FIG. 1 shows the pinch valve 10 combined with the primary inversion fitting 11 in a Y-configuration such that the pinch valve feeds into the primary fitting 11.

Figure 2:
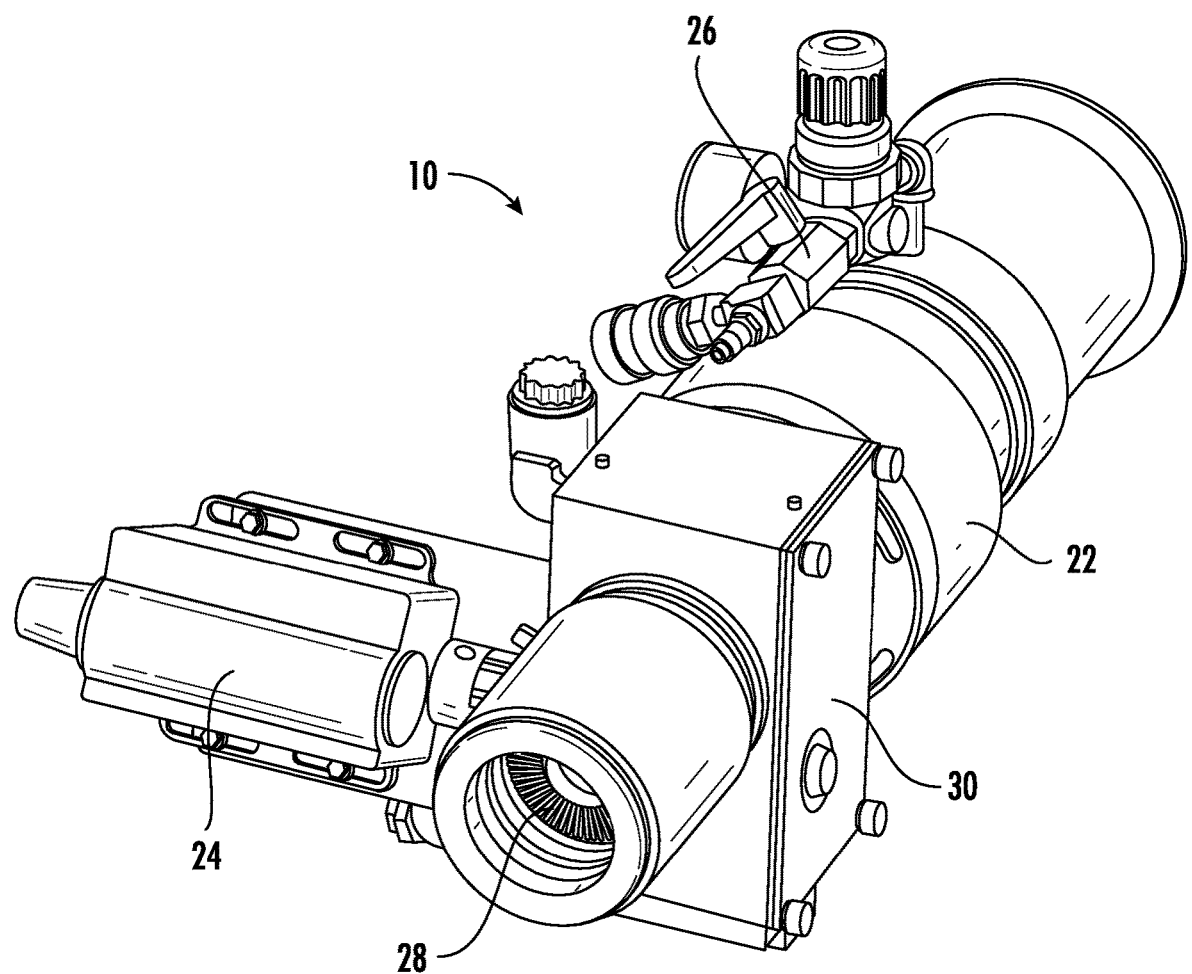
FIG. 2 is a perspective view of a pinch valve combined with a lubricator and a distance counter.
Figure 3:
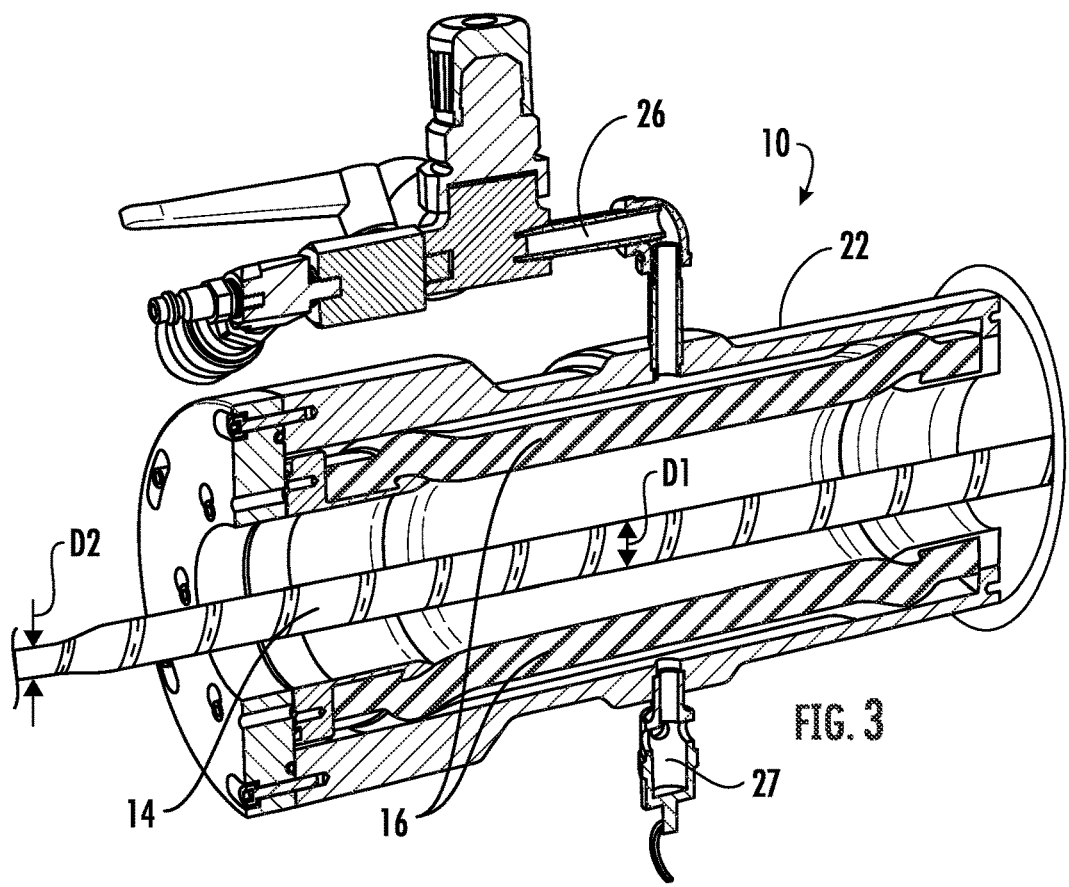
FIG. 3 is a section view of the pinch valve with the deformable member in the first position having an elongated component passing through the lumen.
Figure 4:
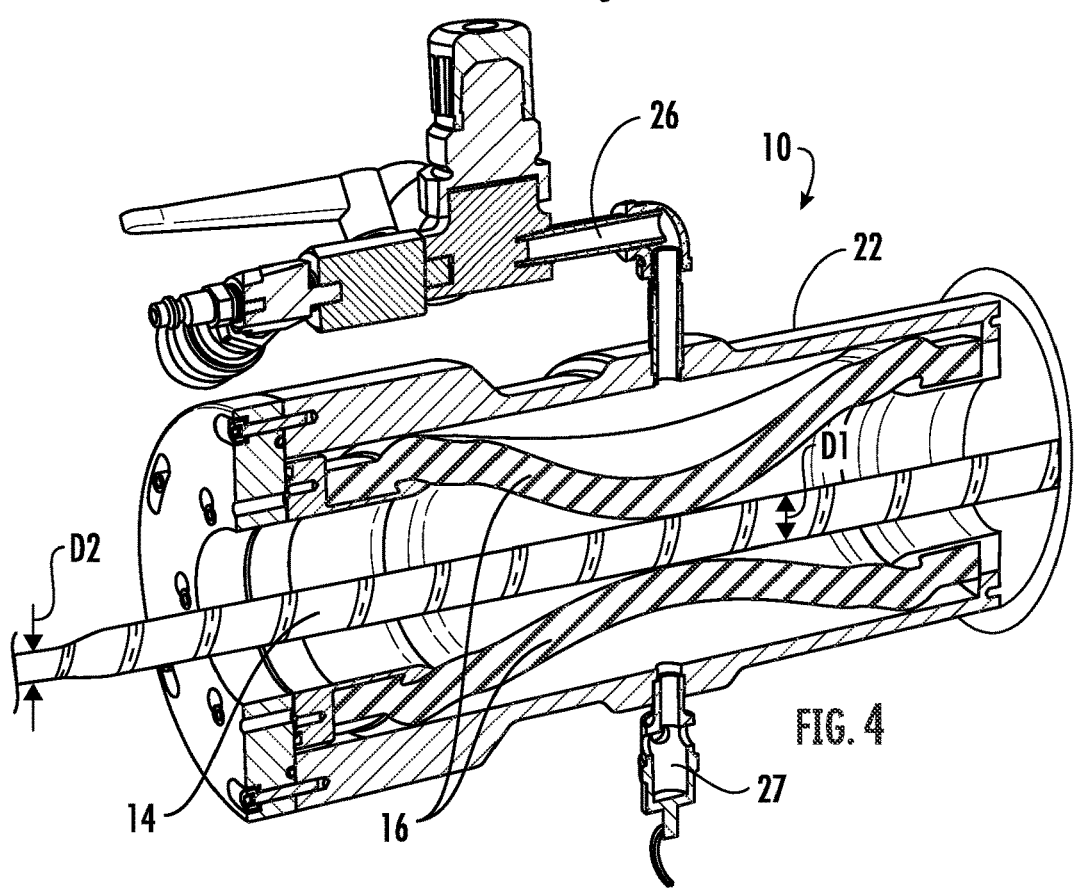
FIG. 4 is a section view of the pinch valve with the deformable member in the second position having an elongated component passing through the lumen.

One embodiment of the pinch valve 10 is shown in more detail in FIGS. 2-4. The pinch valve 10 generally includes a housing 22 having a lumen therein between a first opening and a second opening. A deformable member 16, which may be a sleeve, is positioned within the housing 22 along the lumen between the first opening and the second opening. The deformable member 16 may be made of a rubber or other compressible material to help create a seal between the deformable member and the elongated member 14. A first portion of the deformable member 16 is combined with the housing 22 at a first point and a second portion of the deformable member 16 is combined with the housing 22 at a second point. The two portions of the deformable member 16 may be combined with the housing by a hose clamp, glue, or other suitable means. The deformable member 16 is fluidly sealed at each point such that a sealed volume is created between the outer diameter of the deformable member 16 and the inner diameter of the housing 22 wall.

The deformable member 16 is movable between a first position having a first internal opening (e.g. internal diameter when the cavity is circular) and a second position having a second internal opening that is smaller than the first internal opening. The deformable member 16 has elastic properties and is biased in the first position. In the second position the deformable member 16 is moved to close or narrow around the elongated component 14 as the component 14 passes through the valve 10 to help prevent pressure from escaping through the first opening of the pinch valve 10. The first position is shown in FIGS. 3, 5, 7, and 12 and the second position is shown in FIGS. 4, 6, 8, and 13. In some embodiments fluid pressure is used to inflate the deformable member 16 causing it to move to the second position. One or more fluid channels 26 are combined with the housing 22 to selectively provide fluid pressure from a pressure source into (or remove pressure from) the sealed volume between the housing 22 and the deformable member 16 to cause the deformable member 16 to move between the first and the second position. A pressure relief valve 27 may be in fluid communication with the sealed volume and set to open and release pressure into the atmosphere if the pressure within the sealed volume reaches a predetermined pressure.

The pinch valve 10 is able to conform to various diameters of elongated components 16 passing through the valve 10 in real time by inflating and deflating the member 16 to create the desired internal diameter within the lumen of the valve 10. For example, some types of elongated components 14, such as a light train, may have a first diameter D1 along a first portion, such as the portion having the lights, and a second diameter D2 along a second portion, such as the portion having a power cord but no lights. The member 16 may be inflated such that the diameter of the lumen inside the valve 10 approximates (or slightly larger than) the first diameter D1 when the larger diameter portion of the light train is passing through. Then, the deformable member 16 may be further inflated such that the diameter of the lumen inside the valve 10 approximates (or is slightly larger than) the second diameter D2 when the smaller diameter portion of the light train passes through.

Figure 5:
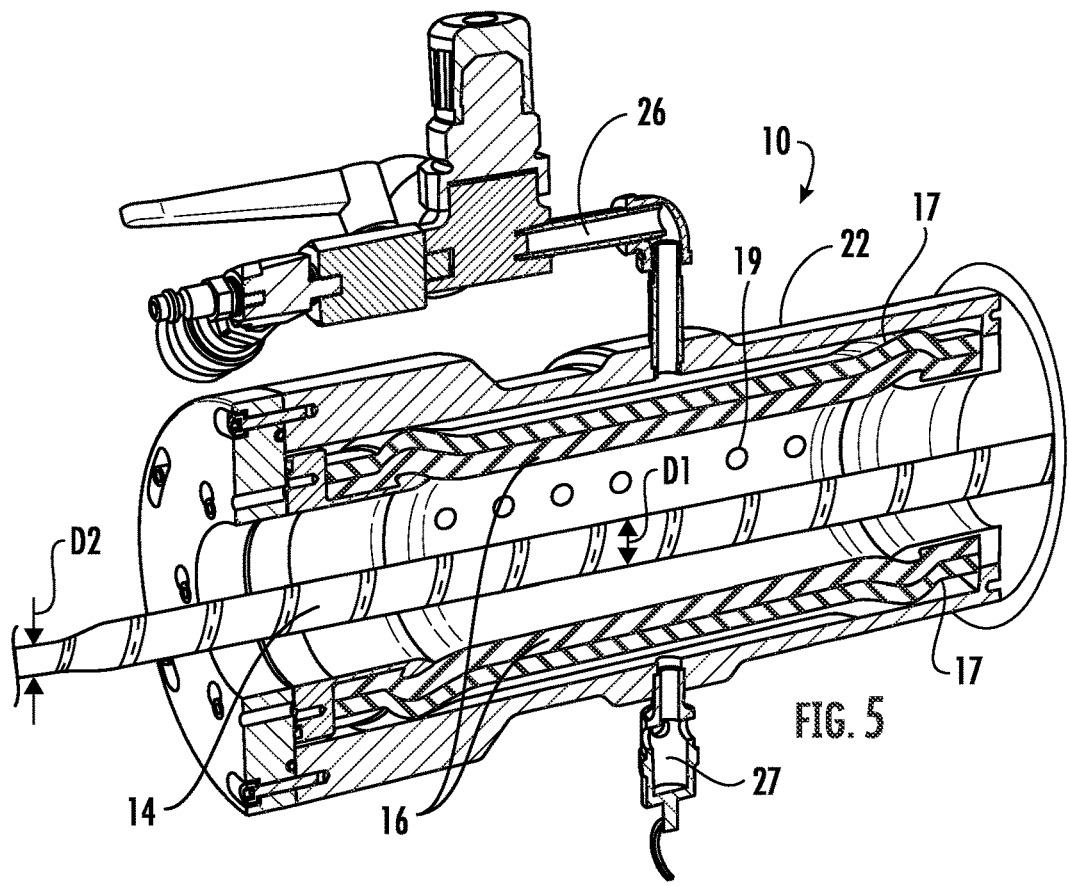
FIG. 5 is a section view similar to FIG. 3 but showing an embodiment further comprising a containment sleeve.
Figure 6:
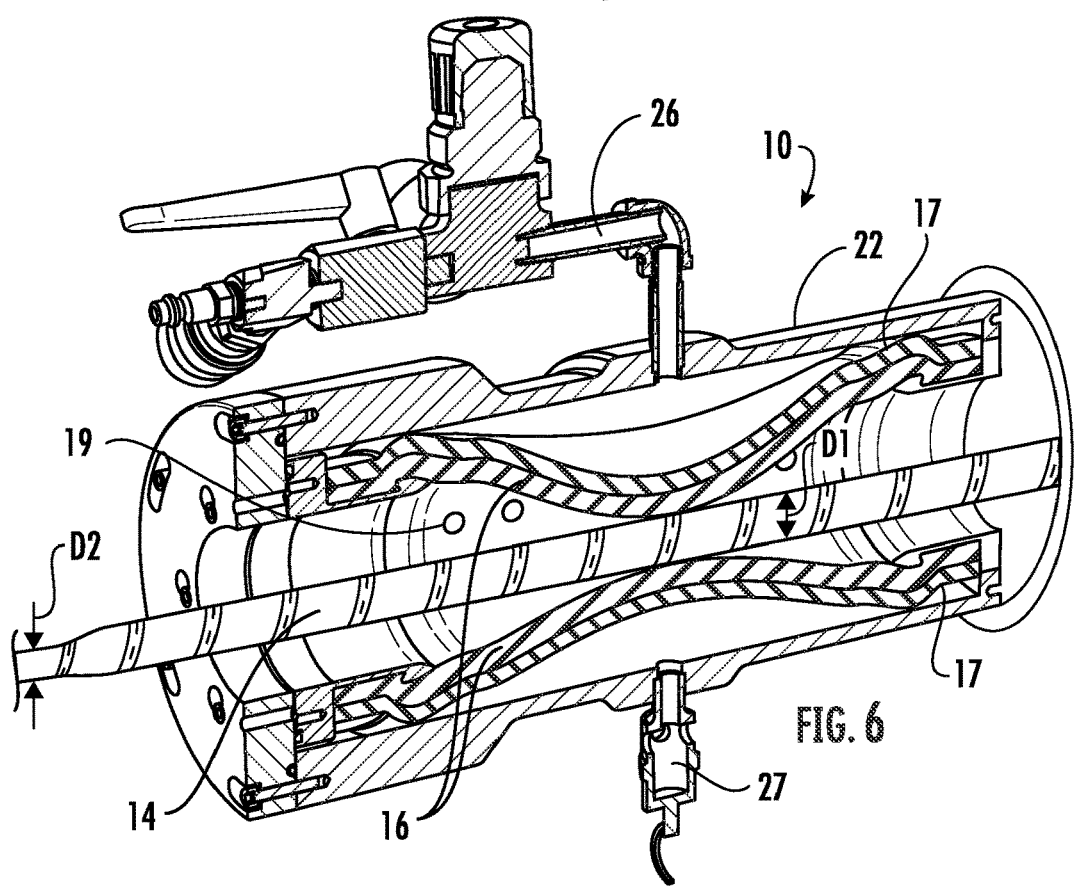
FIG. 6 is a section view similar to FIG. 4 but showing the embodiment further comprising a containment sleeve.

Another embodiment of the pinch valve 10 is shown in more detail in FIGS. 5-6. This embodiment is similar to the embodiment described above, except a second layer referred to herein as a containment sleeve 17 is used in addition to the deformable member 16. The containment sleeve 17 is movable between a first position having a first internal opening (e.g. internal diameter when the cavity is circular) and a second position having a second internal opening that is smaller than the first internal opening and is biased in the first position. A first portion of the containment sleeve 17 is combined with the housing 22 at a first point and a second portion of the containment sleeve 17 is combined with the housing 22 at a second point to create a sealed volume between the outer diameter of the containment sleeve 17 and the inner diameter of the housing 22 wall. In this embodiment the deformable member 16 need not be fluidly sealed to the housing since the containment sleeve 17 serves that function. In some embodiments the containment sleeve 17 is made from a different material than the deformable member 16 and is positioned radially outward from the deformable member 16 so that the lower durometer (more compressible) deformable member 16 engages and creates a seal with the elongated component 14 as it passes through the pinch valve 10. The containment sleeve 17 may be combined with the deformable member 16 by gluing, stitching, or other suitable means. In other embodiments the containment sleeve 17 is adjacent to the deformable member 16 but is a separate component (not attached to the deformable member 16). The containment sleeve 17 is made from a material having a higher elastic modulus (i.e., less flexible/stretchable) and is more robust than the deformable member 16, however, the containment sleeve 17 has some elasticity and is configured to be urged toward the center of the lumen upon the application of pressure. For example, the containment sleeve 17 may be made from a calibration tube/bladder material or a PVC, TPU, PVC, NYLON, Tygon, or Teflon, material. The deformable member 16 is typically a low durometer low flexural strength elastomer/plastic while the containment sleeve 17 is specifically designed with higher flex strength and durometer than the deformable member 16 for mechanical reinforcement. The containment sleeve 17 receives and transfers the pressure to constrict the deformable member 16 to the second position so that the deformable member 16 is protected and not overinflated. The containment sleeve 17 distributes the pressure along the deformable member 16. This is beneficial since applying pressure directly to some types of deformable members 16 may cause weak spots which could overstretch or tear with the continued application of pressure. Further, even if the deformable member 16 gets a hole in it, the more robust containment sleeve 17 is maintained and there is no pressure leak. As shown in FIGS. 5 and 6, in some embodiments holes or openings 19 are made in the deformable member 16 to help prevent air/fluid from getting trapped between the deformable member 16 and the containment sleeve 17.

Figure 7:
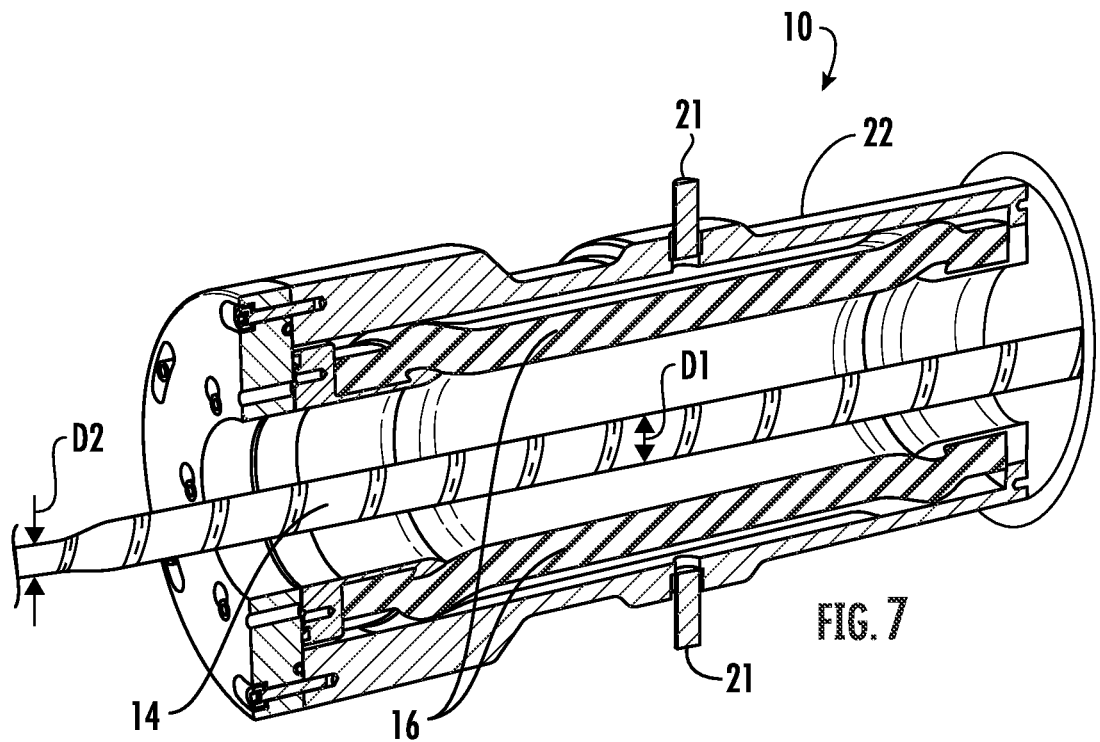
FIG. 7 is a section view similar to FIG. 3 but showing an embodiment wherein the sleeve is moved to the second position by a plunger.
Figure 8:
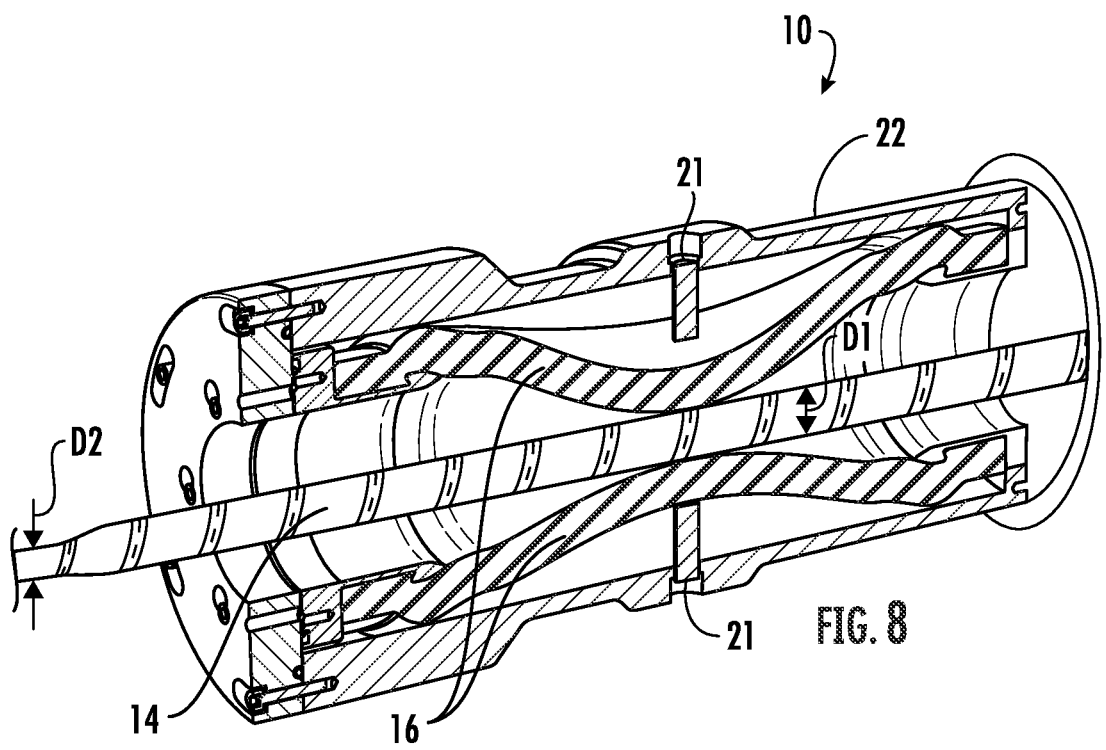
FIG. 8 is a section view similar to FIG. 4 but showing the embodiment wherein the sleeve is moved to the second position by a plunger.

FIGS. 7 and 8 show an alternate embodiment similar to the embodiments described above but having a mechanical plunger 21 apply pressure to the deformable member 16 and/or containment sleeve 17 instead of using fluid pressure. Two or more plungers 21 may be positioned around the circumference of the deformable member 16 and/or containment sleeve 17 to move the deformable member 16 from the first position to the second position. The plungers 21 may be actuated by electric motors or any other suitable means.

In some embodiments the apparatus further includes a lubricator 30 for dispensing lubricant onto the elongated component 14 before it passes through the pinch valve 10. FIG. 2 shows the lubricator 30 combined with the pinch valve 10 and FIG. 5 shows the lubricator 30 separated from the pinch valve 10 and having an elongated component passing therethrough. The lubricator 30 generally includes a housing having a cavity therein with a first opening and a second opening. A reservoir 38 is positioned within the cavity, the reservoir 38 is configured to receive a lubricating solution. A fluid coupling 40 is configured to receive a flow of air which is expelled through one or more nozzles 36 in the lower portion of the reservoir 38 such that the nozzles 36 are beneath the lubricating solution when the reservoir contains solution. The air flowing out of the nozzles 36 causes the lubricating solution to spray or splatter toward and onto the elongated component 14 moving through the lubricator 30 to help lubricate the exterior surface of the elongated component 14. A seal 28 may be positioned between the reservoir 38 and the first opening to help prevent lubricating solution from splattering out of the cavity. As shown in FIG. 5, the seal 28 is an annular brush having a central opening configured to receive the elongated component 14.

Figure 9:
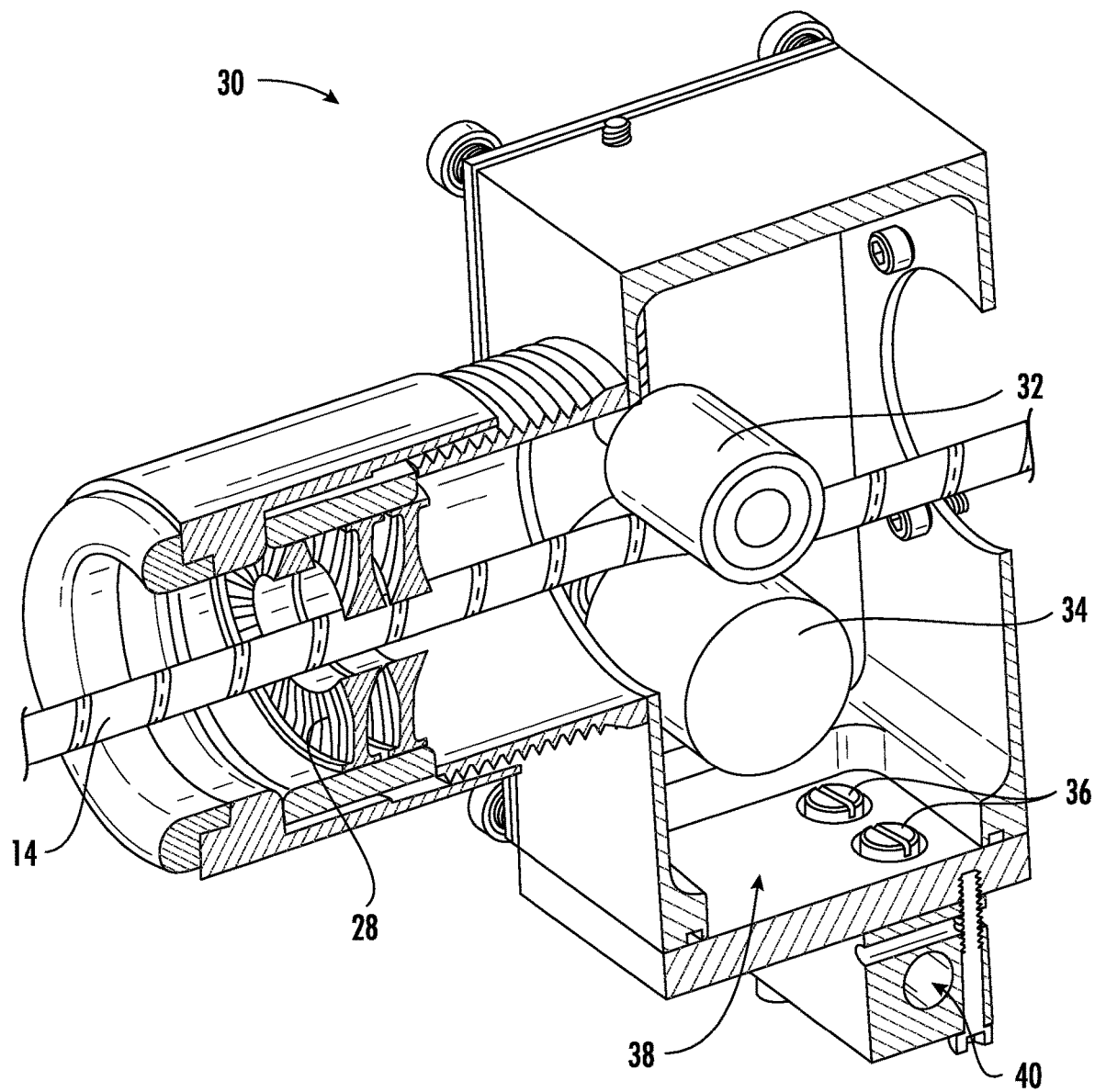
FIG. 9 is a section view of a lubricator.
Figure 10:
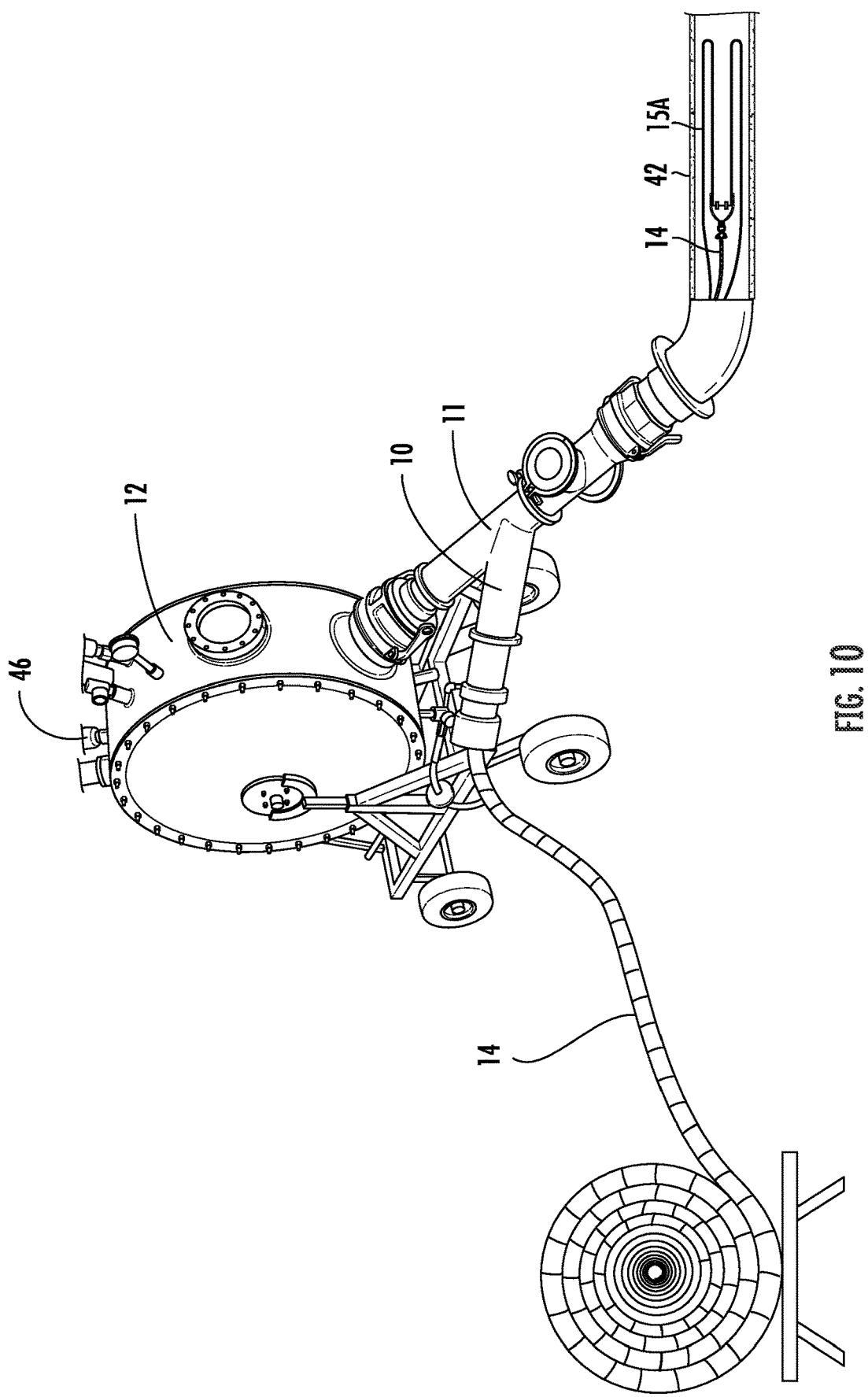
FIG. 10 is a perspective view of an embodiment wherein the pinch valve is used with an assembly to invert a repair assembly into a length of pipe.

In some embodiments the apparatus further includes a distance counter 24 for determining and displaying the length of liner and/or bladder that has passed through the apparatus. FIG. 2 shows the counter 24 combined with the other components and FIG. 9 shows portions of the counter 24 inside the lubricator 30. The counter 24 may include one or more rollers 32, 34 which engage the elongated component 14 as it moves through the apparatus causing the rollers 32, 34 to rotate. The rollers 32, 34 are attached to a counting mechanism that tracks and displays the length of elongated member which passes over the rollers 32, 34. The rollers 32, 34 may include a tensioner 32 and a counter 34. The position of the tensioner 32 is adjustable relative to the counter 34. The adjustability allows the distance between the rollers 32, 24 to change to accommodate different widths of elongated members 14 while also ensuring the elongated member 14 engages the counter 34 with enough force to cause the counter 34 to rotate.

Figure 11:
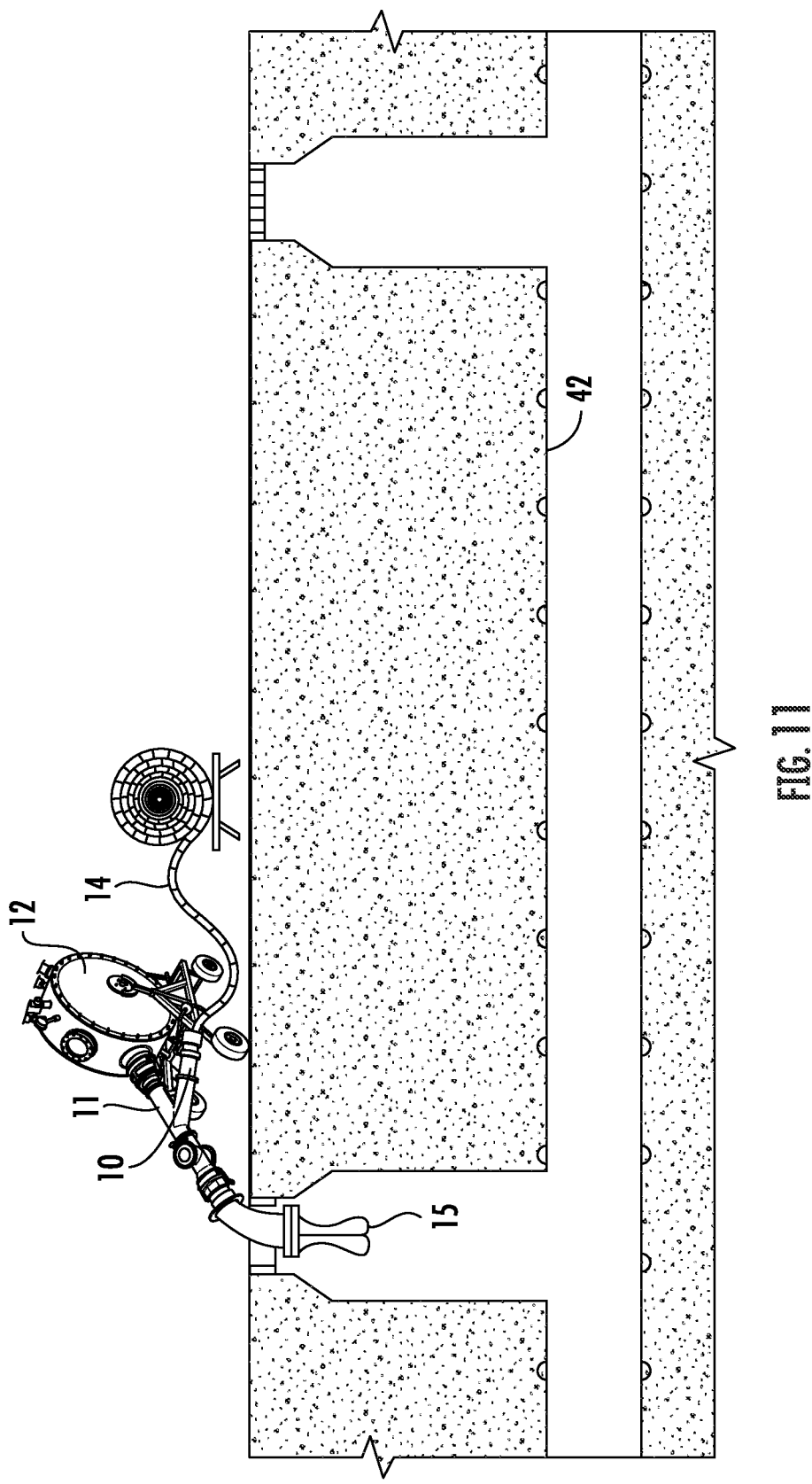
FIG. 11 is a perspective view of an embodiment wherein the pinch valve is used with an assembly to invert a repair assembly into a pipe from manhole to manhole.
Figure 12:
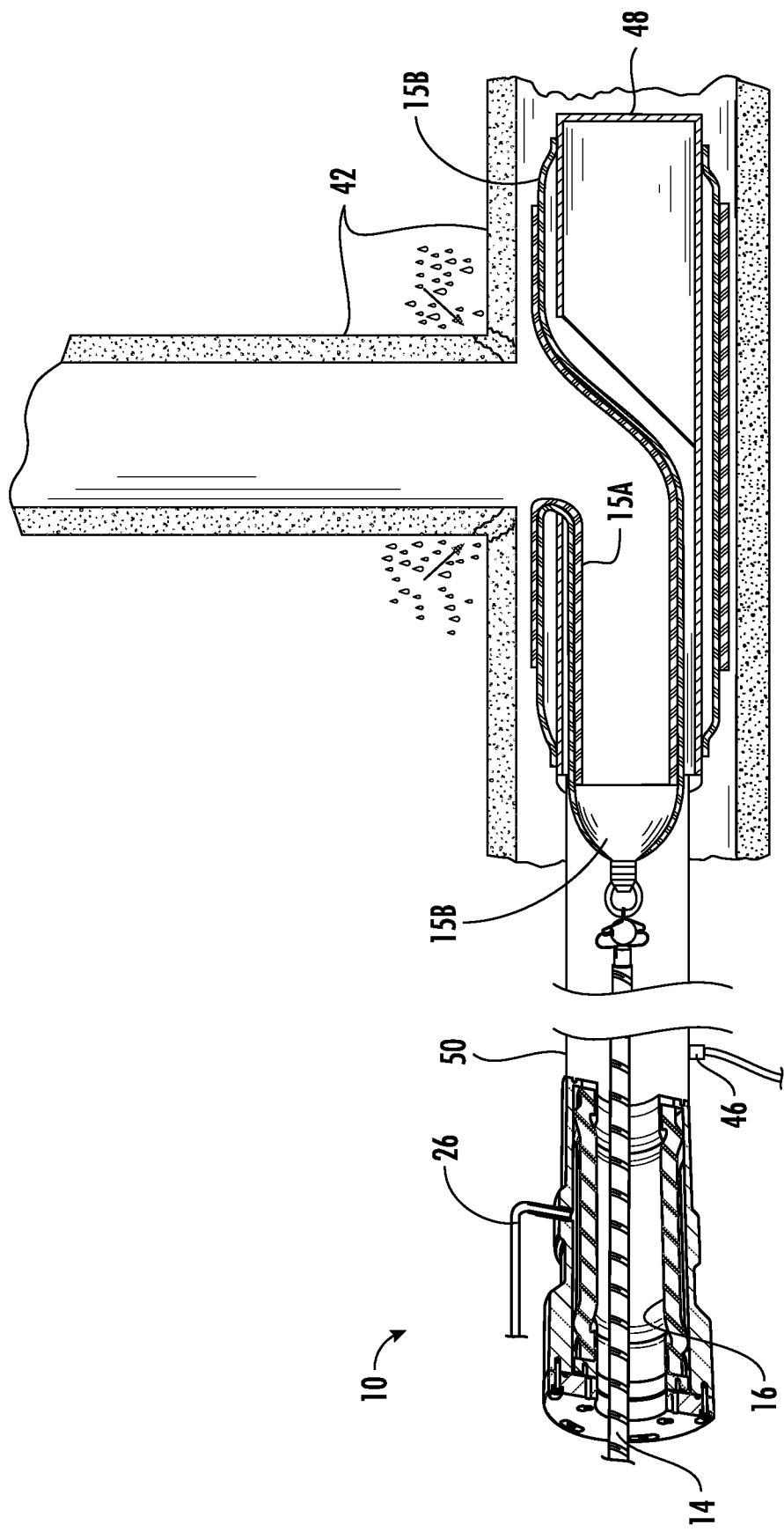
FIG. 12 is a section view of an embodiment wherein the pinch valve is used with an assembly to invert a repair assembly through a launcher into a lateral pipe.
Figure 13:
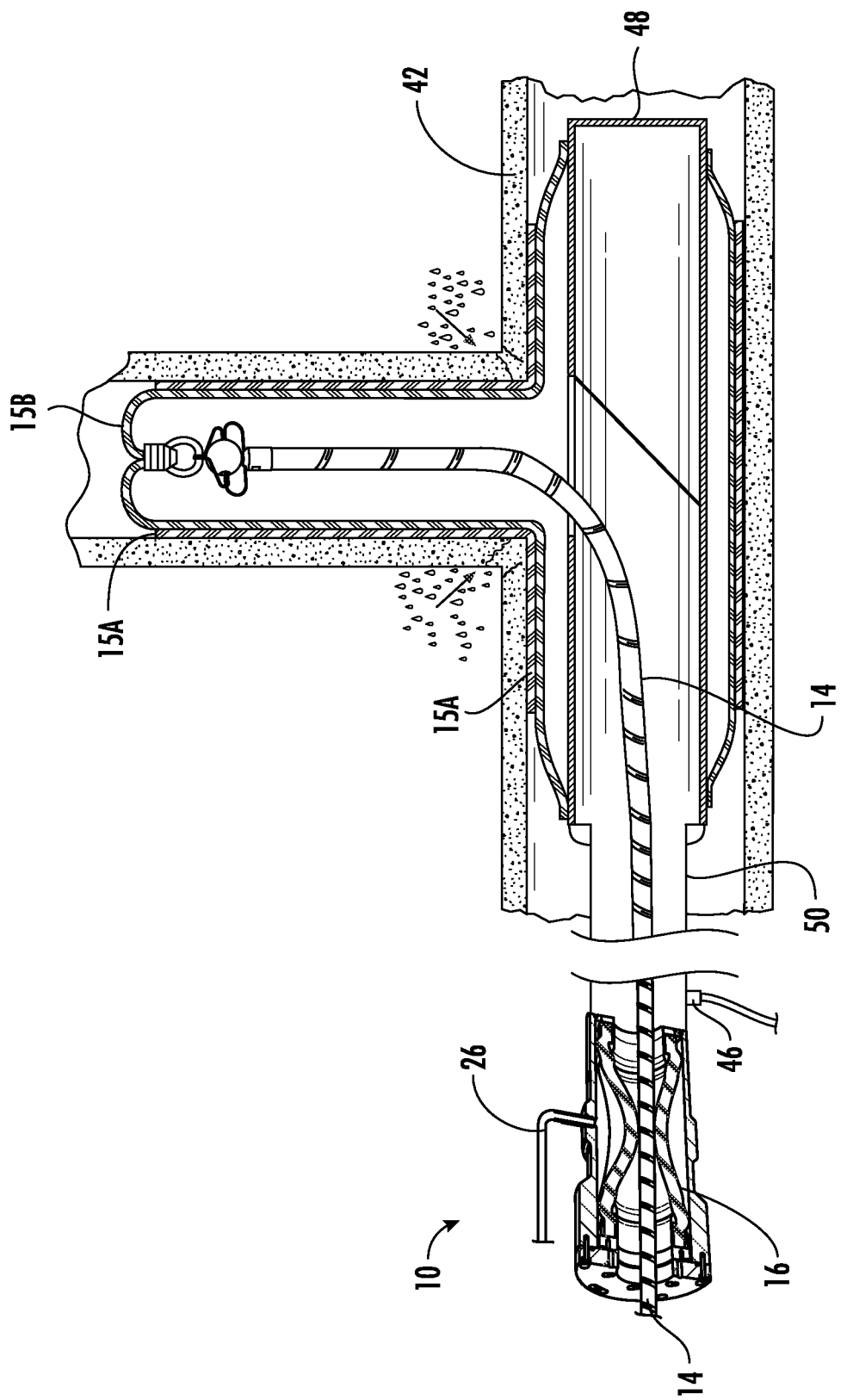
FIG. 13 is a section view similar to FIG. 12 showing the deformable member in the second position.

In use, one or more embodiments of the pinch valve 10 apparatus described above are used to repair a section of an underground pipe 42. FIG. 11 shows the pinch valve 10 apparatus used to help repair a straight length of underground pipe 42 from manhole to manhole. Generally, the apparatus described above with respect to FIG. 1 is used in these types of repairs. FIGS. 12 and 13 show the pinch valve 10 apparatus used in combination with other components to help repair an underground pipe 42 at the juncture between a main pipeline and a second or lateral pipeline. The method includes preparing a repair assembly 15, which may include a liner assembly 15A and/or a bladder assembly 15B, and attaching the repair assembly 15 to a launcher device 48 or a lay flat hose extension 50 extending from an end of a launcher device 48. Pressure is introduced into a coupling 46 in the inversion apparatus 12 or lay flat hose extension 50 to begin inverting the repair assembly into the pipe 42. An elongated component 14, such as a rope, cable, or light train is fed through the pinch valve and attached to the trailing portion of the repair assembly 15 so the trailing portion pulls the elongated component 14 through the pipe. In some embodiments, like the one shown in FIG. 1, the repair assembly 15 is on a reel which unwinds as the repair assembly 15 is inverted, pulled, or pushed into the pipe 24. In the inversion embodiments, the inversion is temporarily stopped about halfway to allows the elongated component 14 to be attached to the trailing portion before the trailing portion enters the pipe 42. A door or hatch 44 may be opened to allow a user to attach the elongated component 14 to the trailing end of the repair assembly 15 after the elongated component 14 has been fed through the pinch valve 10 and before the trailing end enters the pipe 42. The elongated component 14 is able to pass through the lumen of the pinch valve 10 during the inversion of repair assembly 15 into an underground pipe system 42. The deformable member 16 is inflated from a first position to a second position so that the internal diameter of the lumen approximates the diameter of the elongated component 14 to help minimize pressure loss during inversion. If the diameter of the elongated component 14 changes during inversion, then the diameter of the pinch valve 10 is similarly adjusted by inflating or deflating the deformable member 16 to approximate the changed diameter of the elongated component 14.

After the repair assembly 15 is inverted within the pipe 42, a fluid such as air is used to inflate the repair assembly 15 to urge the liner assembly 15A against the interior wall of the pipe 42. After the liner assembly 15A has cured and hardened, the launcher device (if any), bladder assembly 15B (if any), and elongated component 14 are removed from the pipe 42. In some embodiments the elongated component 14 is used to retrieve or pull portions of the repair assembly 15, such as an extension tube or lateral bladder 15B, out of the lateral pipe.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

The invention claimed is:

1. A pinch valve comprising:
    a housing having a lumen therein between a first opening and a second opening, the lumen configured to receive an elongated component;
    a deformable member positioned within the housing along the lumen, wherein the deformable member is movable between a first position having a first internal diameter and a second position having a second internal diameter that is smaller than the first internal diameter; and
    an assembly configured to selectively move the deformable member from the first position to the second position,
    wherein the assembly is an electromechanical assembly comprising a plunger movable between a retracted position and an engaged position by a motor.

2. The pinch valve of claim 1 wherein the assembly is one of a pressure assembly, a vacuum assembly, a mechanical assembly, and an electromechanically assembly.

3. The pinch valve of claim 1 wherein the assembly is a pressure assembly comprising a fluid channel configured to selectively introduce fluid pressure from a fluid pressure source into a cavity formed between the housing and the deformable member.

4. The pinch valve of claim 1 where a first portion of the deformable member is sealed with the housing at a first point and a second portion of the deformable member is sealed with the housing at a second point creating a sealed volume between an outer diameter of the deformable member and an inner diameter of the housing, wherein a fluid channel is in fluid communication with the sealed volume to selectively introduce fluid pressure from a fluid pressure source into the sealed volume.

5. A pinch valve comprising:
a housing having a lumen therein between a first opening and a second opening, the lumen configured to receive an elongated component,
a deformable member positioned within the housing along the lumen, wherein the deformable member is movable between a first positon having a first internal diameter and a second positon having a second internal diameter that is smaller than the first internal diameter;
an assembly configured to selectively move the deformable member from the first position to the second position; and
a containment sleeve positioned radially outward from the deformable member, the containment sleeve movable between a first containment sleeve position having a first containment sleeve internal diameter and a second containment sleeve position having a second containment sleeve internal diameter that is smaller than the first containment sleeve internal diameter.

6. The pinch valve of claim 5 wherein the containment sleeve is biased in its first containment sleeve position.

7. The pinch valve of claim 5 where a first portion of the containment sleeve is sealed with the housing at a first attachment point and a second portion of the containment sleeve is sealed with the housing at a second attachment point creating a sealed volume between an outer diameter of the containment sleeve and an inner diameter of the housing.

8. The pinch valve of claim 5 where the deformable member is made from a first material having a first elastic modulus and the containment sleeve is made from a second material having second elastic modulus that is higher than the first elastic modulus.

9. The pinch valve of claim 5 wherein the deformable member is made from a compressible material configured to engaged the elongated member and create a seal between the deformable member and the elongated member.

10. The pinch valve of claim 5 wherein the containment sleeve is made from a material that is less compressible than the deformable member.

11. The pinch valve of claim 5 further comprising an opening in the deformable member to allow fluid to pass through the deformable member.

12. The pinch valve of claim 1 wherein the deformable member is further movable to a third position having a third internal diameter.

13. The pinch valve of claim 1 wherein the deformable member is a sleeve.

14. The pinch valve of claim 1 wherein the pinch valve is combined with a primary fitting configured to receive an inverting repair assembly.

15. A pinch valve comprising:
a housing having a lumen therein between a first opening and a second opening, the lumen configured to receive an elongated component;
a deformable member positioned within the housing along the lumen, wherein the deformable member is movable between a first position having a first internal diameter and a second position having a second internal diameter that is smaller than the first internal diameter,
an assembly configured to selectively move the deformable member form the first position to the second position;
a lubricator having a lumen between an entrance opening and an exit opening, the lumen configured to receive the elongated component;
a fluid reservoir configured to receive a liquid lubricant; and
a nozzle configured to be attached to a pressurized source of a gas;
wherein the nozzle is configured to expel the gas into the fluid reservoir to splatter the liquid lubricant onto the elongated component.

16. The pinch valve of claim 15 wherein the lubricator further comprises a seal near the entrance opening.

17. A pinch valve comprising:
a housing having a lumen therein between a first opening and a second opening, the lumen configured to receive an elongated component;
a deformable member positioned within the housing along the lumen, wherein the deformable member is movable between a first position having a first external diameter and a second position having a second internal diameter that is smaller than the first internal diameter;
an assembly configured to selectively move the deformable member from the first position to the second position; and
a distance counter having a tensioner roller and a counter roller, the tensioner roller and the counter roller configured to engage opposite sides of the elongated component as the elongated component moves causing the counter roller to rotate, wherein the counter roller is attached to a counting mechanism configured to measure the length of elongated member passing over the counter roller.

18. The pinch valve of claim 1 wherein the elongated component is one of a rope, a cable, or a light train.

19. The pinch valve of claim 1 wherein deformable member is biased in the first position.

20. A pinch valve comprising:
a housing having a lumen therein between a first opening and a second opening;
a deformable member positioned within the housing along the lumen, wherein the deformable member is movable between a first position having a first internal diameter and a second position having a second internal diameter that is smaller than the first internal diameter;
a containment sleeve positioned radially outward from the deformable member, wherein the containment sleeve is movable between a first containment sleeve position having a first containment sleeve internal diameter and a second containment sleeve position having a second containment sleeve internal diameter that is smaller than the first containment sleeve internal diameter; and
a fluid channel configured to selectively introduce fluid pressure from a fluid pressure source into a cavity formed between the housing and the containment sleeve to cause the containment sleeve to move from the first containment sleeve position to the second containment sleeve position which causes the deformable member to move from the first position to the second position.

21. The pinch valve of claim 20 where the deformable member is made from a first material having a first elastic modulus and the containment sleeve is made from a second material having second elastic modulus that is higher than the first elastic modulus.

22. The pinch valve of claim 20 wherein the deformable member is made from a compressible material configured to engaged the elongated member and create a seal between the deformable member and the elongated member.

23. The pinch valve of claim 20 wherein the containment sleeve is made from a material that is less compressible than the deformable member.

24. The pinch valve of claim 20 further comprising an opening in the deformable member to allow fluid to pass through the deformable member.

25. The pinch valve of claim 20 wherein the deformable member is a sleeve.

26. The pinch valve of claim 20 wherein the pinch valve is combined with a primary fitting configured to receive an inverting repair assembly.

27. A method of repairing a pipeline having interior walls, said method comprising:
- operatively connecting a pinch valve to an inversion apparatus;
- taking a repair assembly and an elongated component, passing the elongated component through the pinch valve, wherein the elongated component has a diameter;
- moving the deformable member from a first position having a first internal diameter to a second position having a second internal diameter that is smaller than the first internal diameter;
- using fluid pressure to invert the repair assembly into the pipeline and urge the repair assembly into contact with the interior walls of the pipeline as the elongated component moves through the pinch valve;
- wherein the pinch valve comprises a containment sleeve positioned radially outward from the deformable member and the method further comprising introducing fluid pressure from a fluid pressure source into a cavity formed between the housing and the containment sleeve to cause the containment sleeve to move from a first containment sleeve position to a second containment sleeve position.

28. The method of claim 27 further comprising attaching the elongated component to a trailing portion of the repair assembly so the inverting repair assembly pulls the elongated component through the pinch valve.

29. The method of claim 27 wherein the internal diameter of the deformable member approximates the diameter of the elongated component.

30. The method of claim 27 further comprising moving the deformable member to a third position having a third internal diameter while the elongated component is moving through the pinch valve.

31. The method of claim 27 wherein the method further comprises reducing the diameter of the deformable member from the first diameter to the second diameter while the elongated member is moving through the pinch valve.

32. The method of claim 27 further comprising taking a lubricator having a fluid reservoir and a nozzle, wherein the fluid reservoir is configured to receive a liquid lubricant, the method further comprising introducing a gas through the nozzle to expel the gas into the fluid reservoir and splatter the liquid lubricant onto the elongated component.

* * * * *